D. STRATTAN.
Tire-Shrinker.
No. 160,729. Patented March 9, 1875.
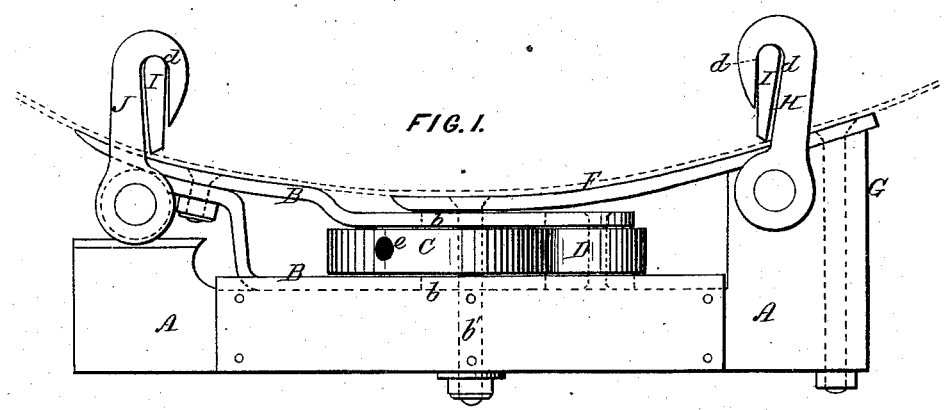
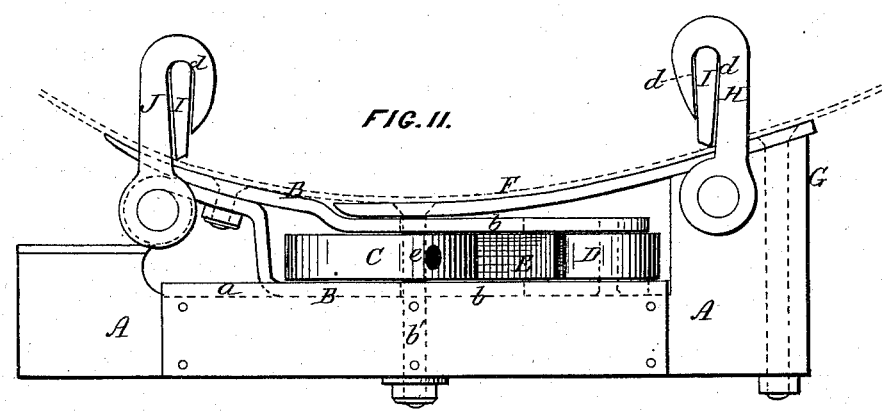
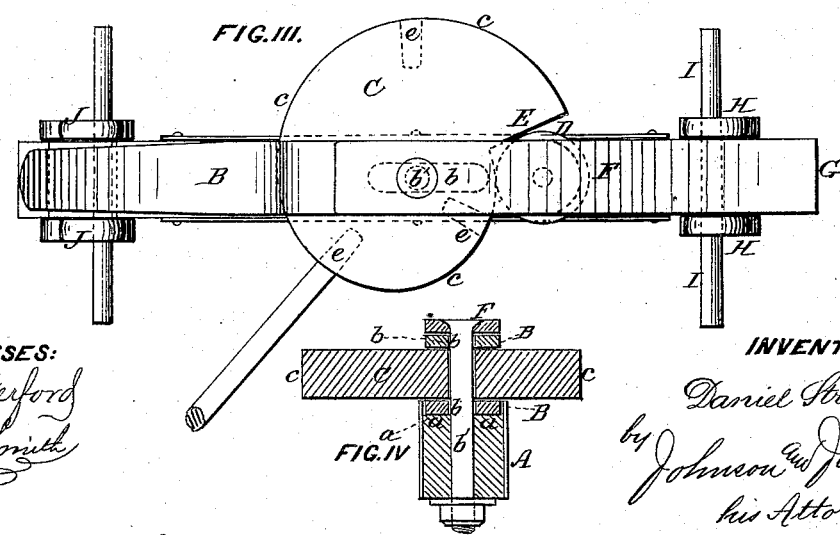
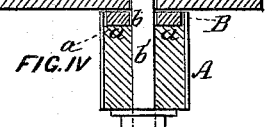
WITNESSES:
J. H. Rutherford
T. C. Smith
INVENTOR:
Daniel Strattan
by Johnson and Johnson
his Attorneys.
THE GRAPHIC CO. PHOTO-LITH. 39 & 41 PARK PLACE, N.Y.

UNITED STATES PATENT OFFICE.

DANIEL STRATTAN, OF CASSOPOLIS, MICHIGAN, ASSIGNOR OF ONE-HALF HIS RIGHT TO JOSEPH GRAHAM, OF SAME PLACE.

IMPROVEMENT IN TIRE-SHRINKERS.

Specification forming part of Letters Patent No. 160,729, dated March 9, 1875; application filed December 28, 1874.

*To all whom it may concern:*

Be it known that I, DANIEL STRATTAN, of Cassopolis, in the county of Cass, in the State of Michigan, have invented certain new and useful Improvements in Devices for Shrinking Tire, of which the following is a specification:

My invention relates to tire upsetting or shrinking devices, to cause the tires to be fitted tightly upon their wheels; and the invention therein consists of a forked slide having an anti-friction roller on its inner end, arranged for action upon the face of a cam turning loosely on its axis, having a deep radial offset, the said slide being arranged to embrace the cam in the line of the fixed tire-support or bed, to which the axis of the cam is secured, the object being to attain by such an arrangement and combination a comparatively cheap and effective device for the purpose, and in which the acting surface of the cam shall draw in the slide in shrinking the tire without binding, and by its radial offset allow the slide to be opened, while the cam remains in position for repeating the inward movement of the slide, as shown in Fig. 3 of the drawings; also, in the combination of the pivoted arms for the wedges with the fixed tire-support or bed and the slide, whereby said arms and their wedges are adjusted to the circle of the tire without regard to the position of the slide, and the wedges thereby caused to make their hold upon the tire more readily and effective.

In the accompanying drawings, Figure 1 represents a side elevation of a device embracing my invention, with the parts adjusted in position to upset the tire; Fig. 2, a similar view, showing the parts in position after the tire has been upset; and Fig. 3, a top view of Fig. 1.

The operating devices are mounted upon a narrow bed-timber, A, which may be bolted to the wall or upon a work-bench, as may be most convenient. A forked slide, B, is arranged in a groove, *a*, Fig. 4, upon this bed, and a cam, C, is secured to the middle of the latter, and located between the arms of the slide, which are provided with slots $b\ b$, to allow them to move over the axis-pin $b'$ of the cam, whose outer face $c$ acts directly upon an anti-friction roller, D, carried between the inner ends of the slide. The cam has a deep radial offset, E, and, in acting upon the roller D, draws the slide B inward, and after the offset has passed the roller the slide is left free to be drawn back, with its roller, against the least point of the cam's projection from the axis, as shown in Figs. 1 and 3. The support or bed F for the tire is arranged upon and in line with the slide B, and the axis-pin of the cam is secured therein, while the outer end of said bed is secured to an elevation, G, on the end of the bed A. The slide and tire-support need not be but little wider than the tire, and they both lap above the cam C, and thereby form, with the cam, a solid bed, upon which the upsetting and shrinking are effected. The tire is clamped upon its support F by arms H, pivoted to the elevation G, so as to embrace the support F, and having openings *d* for a wedge, I, which, when inserted, bites upon the inner side of the tire, and clamps it upon the support. Similar wedge-holding clamping-arms J are pivoted to the outer end of the slide B, and move with it, so that, the tire being clamped in an upright position fast upon its fixed support and to the slide, the movement of the latter toward the former upsets the tire at the middle of the bed, and the proper shrinkage thereby made, the tire, of course, having previously been heated to a welding heat at the point of shrinking; the advantages of pivoting the clamping-arms being their capacity for adjustment to the tire, and in throwing them back out of the way in placing the tire in position, and bringing them up for the insertion of the wedges, thereby avoiding the necessity of having to effect such adjustment by the movement of the slide.

In Fig. 2 the slide and cam are shown in the positions they occupy when the tire is shrunk or upset, and in Figs. 1 and 3 these parts are seen in the positions at the start of the operation.

The face of the cam C is provided with a series of holes, *e*, by which to turn it against the roller by a lever, which is withdrawn and again inserted as the cam is turned. The cam and roller only act together in drawing in the slide, the latter being drawn out by hand, and there is no chance for the cam to bind, as it works freely against the roller.

I claim—

1. The tire-shrinking device consisting of the cam C, having the offset E, the slide B, with its roller D, the fixed tire-support F, and the pivoted arms H J, constructed and arranged for joint operation substantially as described.

2. The pivoted wedge-holding arms H J, in combination with the slide B and the fixed tire-support F, substantially as described, and for the purpose stated.

DANIEL STRATTAN.

Witnesses:
CALVIN T. HUNGERFORD,
EZRA STRATTAN.